(12) United States Patent
Mah

(10) Patent No.: US 6,202,861 B1
(45) Date of Patent: Mar. 20, 2001

(54) COMPACT DISC DISPLAY TOWER

(76) Inventor: Pat Y. Mah, Unit C, 8/F., Leroy Plaza, 15 Cheung Shun St., Cheung Sha Wan, Kowloon (HK)

( * ) Notice: Subject to any disclaimer, the term of this patent is extended or adjusted under 35 U.S.C. 154(b) by 0 days.

(21) Appl. No.: 09/434,220

(22) Filed: Nov. 4, 1999

(51) Int. Cl.[7] .................................................. A47G 29/00
(52) U.S. Cl. ............................................................. 211/40
(58) Field of Search .................................. 211/40, 41.12, 211/163, 121, 1.57, 1.52

(56) References Cited

U.S. PATENT DOCUMENTS

| | | | | |
|---|---|---|---|---|
| 5,040,689 | * | 8/1991 | Hull et al. ............................. | 211/121 |
| 5,259,515 | * | 11/1993 | Koeppel ................................ | 211/40 |
| 5,385,397 | * | 1/1995 | Chow .................................... | 211/40 |

\* cited by examiner

*Primary Examiner*—Alvin Chin-Shue
*Assistant Examiner*—Sarah Purol
(74) *Attorney, Agent, or Firm*—Curtis L. Harrington

(57) ABSTRACT

A motorized compact disc tower rack can hold a high number of jewel cases in a series of belt arranged spacing sleeves which rotates between two main side supports. The side supports may accommodate side lighting for effect, as well as top lighting illumination for showcasing the jewel cases as they pass from one side of the belt to the other by flipping over the top and underneath the bottom. The side sectional shape of the path of the conveyor plurality of spacing sleeves is radiused more sharply at the top to more dramatically physically illustrate the jewel case at the top which transitions from one side of the belt arranged spacing sleeves. At the base of the tower, and forward and reverse actuation switches enable a user to select the forward or rearward movement of the conveyor of the plurality of spacing sleeves. Ideally, the user will simply watch the jewel cases as they increase their adjacent angular spacing as they flip move over the top of the tower where they are easily seen and easily grasped at the upper portion of the conveyor arrangement.

15 Claims, 3 Drawing Sheets

COMPACT DISC DISPLAY TOWER

FIELD OF THE INVENTION

The present invention relates to the field of entertainment display and storage devices, and more particularly to providing a tower height revolving stand for storing, displaying and viewably reviewing compact disc jewel cases in a manner which readily enables identification and selection, as well as in controlling the manner of display.

BACKGROUND OF THE INVENTION

Compact disc technology enables significant data to be placed on a disk of limited size. While the reduction in size has benefitted overall ownership, the shape of the compact discs and the jewel cases in which they are sold and stored has so reduced the end edge area for indicating the contents of the case that storing the compact discs flat in a long stack reduces the area for indicating the contents of the jewel case to such an extent that it is difficult to review the compact discs available. Storing the jewel cases in stacks where direct case-to-case contact is had also tends to scratch and damage the jewel cases. Each time the jewel cases are manually handled, more scratches occur.

Other compact disc support and storage structures are known. In one example, an individual jewel case support can be mounted on walls to give a tile effect and to show off the cases. In another example, a vertical square edge metal stand can have a series of cuts to accommodate each jewel case, with each case held in a cantilevered fashion. This also contributes to damaging the case since the pressure points are likely to be applied to the case at locations other than the edges.

What is therefore needed is a device which strikes an advantageous balance between the need to display the compact disc jewel cases, storage of the jewel cases, and selection and replacement into a storage medium without damage.

SUMMARY OF THE INVENTION

A motorized compact disc tower rack can hold a high number of jewel cases in a series of belt arranged spacing sleeves which rotates between two main side supports. The side supports may accommodate side lighting for effect, as well as top lighting illumination for showcasing the jewel cases as they pass from one side of the belt to the other by flipping over the top and underneath the bottom. The side sectional shape of the path of the conveyor plurality of spacing sleeves is radiused more sharply at the top to more dramatically physically illustrate the jewel case at the top which transitions from one side of the belt arranged spacing sleeves. The bottom larger radius turn provides a more gentle transition since the jewel cases are not typically viewed at the bottom.

The jewel cases insert into the sleeves at the front of the rack typically with the title information readable from the front as a vertical series of labels. The jewel cases are arranged at the top of the conveyor plurality of spacing sleeves so that the jewel case information faces in the same direction as the front of the rack. In this orientation, and regardless of the direction of travel of the conveyor belt arrangement of plurality of spacing sleeves, the jewel cases will flip over the top with the main face of the jewel case facing the front of the tower.

At the base of the tower, and forward and reverse actuation switches enable a user to select the forward or rearward movement of the conveyor of the plurality of spacing sleeves. Ideally, the user will simply watch the jewel cases as they flip over the top of the tower as the jewel cases travel up the front, flipping toward the back and down the back side of the tower, or as the jewel cases travel up the back, flipping toward the front and down the front side of the tower. A jewel case can be easily grasped at the upper portion of the conveyor arrangement of the plurality of spacing sleeves since the jewel cases are at maximum angular displacement with respect to adjacent jewel cases at that point. The adjacent angular displacement both helps the user to review the face of each jewel case and to grasp the case of interest. An optional spotlight illumination concentrates attention on the top jewel cases as they appear at their maximum angular displacement. Other options include side lighting which reacts to the audio level of music being played.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

Figure 1:
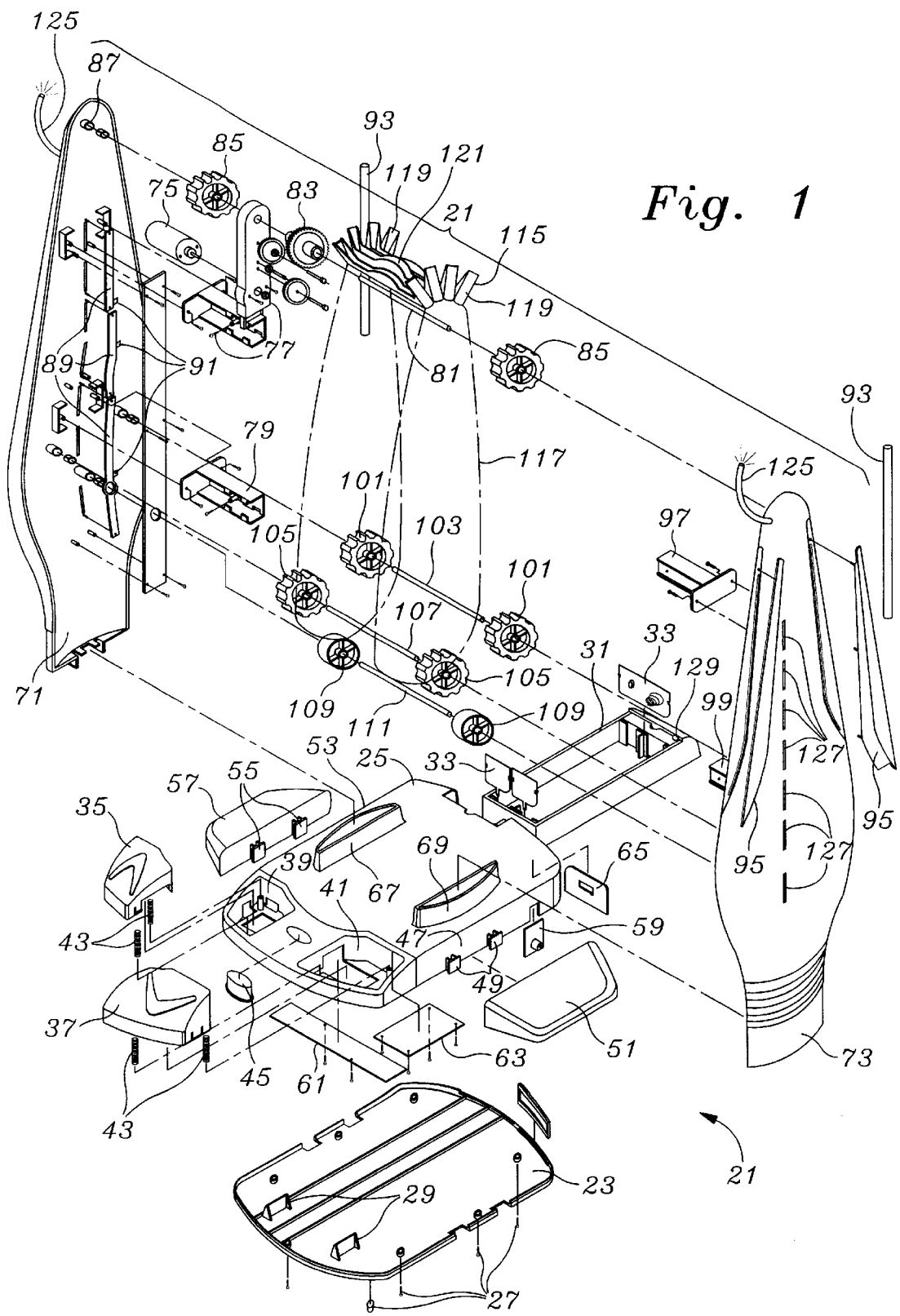
FIG. 1 is a perspective exploded view of the compact disc motorized tower of the present invention and illustrating the component parts thereof.

The description and operation of the invention will be best initiated with reference to FIG. 1 and which illustrates a compact disc jewel case motorized rack 21, or simply rack 21. From the bottom of FIG. 1, a base plate 23 provides a non damaging stable bottom surface upon which the rack 21 will be supported in a stable manner. A base cover 25 fits onto the base plate 23 typically with a series of screws 27. The base plate 23 includes a pair of alignment guides 29 which assist in aligning and stabilizing the base cover 25 onto the base plate 23.

Slidably mounted into the space between the base plate 23 and base cover 25 is a battery tray 31 having end contact inserts 33 for forming contact with aligned batteries which are to power the rack 21. A pair of oversized buttons 35 and 37 have boomerang "V" shaped direction arrows and are shown to mount within apertures 39 and 41, respectively of the base cover 25. The buttons 35 and 37 are upwardly urgingly supported by springs 43. A center insert button 45 may be used to operate as an on/off switch, or to enable side lighting or sound reactive lighting or top spot lighting or all of these functions.

A side 47 of the base cover 25 includes a pair of male projections 49 which mate with a side stabilization foot 51 having mating female spaces (not seen) to accommodate the male projections 49. A side 53 of the base cover 25 includes a pair of female spaces which mate with male projections 55 of a side stabilization foot 57. The side stabilization feet 57 and 51 are used when the rack 21 is used singly. The arrangement of projections 49 and 55 enable the covers 25 to be laterally attached to other units for use as a bank of such racks. An electrical connection 59 is shown for electrical connection to an adjacent rack 21 to enable a bank of such racks to operate simultaneously. As can be seen from the orientation of FIG. 1, linking two adjacent racks 21 together simply involves removing the stabilization foot 51 of one rack 21 and the stabilization foot 57 of an adjacent rack 21 and mechanically connecting the adjacent racks 21 together in the same manner as the stabilization feet 51 & 57 were attached to a single cover 25. Linking adjacent racks 21 with the electrical connector 59 is optional.

Bottom plates 61 and 63 provide bottom access to the space between the base cover 25 & base plate 23. An additional rear access panel 65 is also seen. The base cover 25 includes a first and second support projection 67 and 69 which engage and support a side support 71 and 73, respectively. Side supports 71 and 73 are typically dish formed structures having stable dependence from the support projections 67 and 69. Adjacent the upper side of side support 71 a motor 75 is seen located next to a motor support and gear set 77. In assembled configuration, the motor 75 supported by the motor support and gear set 77 is supported generally compactly within the space between the side supports 71 and 73. Below the motor support and gear set 77 is an intermediate support 79 about half way between base cover 25 and motor support and gear set 77. Both the motor support and gear set 77 and intermediate support 79 and the first and second support projection 67 and 69 act to stabilize all of the supported members dependent thereon.

The rack 21 utilizes only three principle gears or gear sets to drive a continuous belt arranged spacing sleeves of which only four are seen at the top of the rack 21 and which are described below. The gear sets are arranged with one at the top and two nearer the bottom which may be nearer each other than the top gear set. The two gear sets below may be arranged in a level parallel fashion or may be vertically offset in addition to being forwardly and rearwardly offset. This forms a triangular shape, when taken from the side, a generally isosceles triangular arrangement. This isosceles triangular arrangement provides a more sharply defined angular turn at the top thereof in order to better illustrate the greater area flat sides of the jewel cases supported.

An axle 81 engages a drive wheel 83 and a pair of sprockets 85. The axle 81 extends through the top of the motor support and gear set 77 and takes support from the side support 71 and 73, one fitting 87 of which is shown in the side support 71. Axle 81 and sprockets 85 form the upper gear set of the isosceles arranged gear sets and it is the gear set which is directly linked to the gear set of motor support and gear set 77. The side supports 71 and 73 are generally identical. A series of color strips 89 may be mounted against the side supports 71 and 73 and may or may not be lighted by lights 91. The lights 91 may be of the incandescent type, light emitting diode type, and/or may include a fluorescent tube 93. Even where the fluorescent tube 93 is used, the diodes 91 can be used to modulate in response to surrounding sound level. Also seen with regard to side support 73 are a pair of color panels 95. All color panels 95 and color strips 89 are preferably light transmitting members which can transmit light occurring within and between the side supports 71 & 73, and generally add to the decorative nature of the rack both when illuminated and when not illuminated.

Adjacent side support 73 an upper support 97 lies opposite and engages the motor support portion of motor support and gear set 77. Below upper support 97, an intermediate support 99 lies opposite and engages intermediate support 79.

A sprocket set 101 rotates on an axle 103 opposite a sprocket set 105 on an axle 107. Sprocket sets 101 and 105 form the pair of lower gear sets of the isosceles triangular arrangement. Sprocket sets 101 and 105 merely act to give some spaced apart front and rear angularity to the continuous belt arranged spacing sleeves as they approach the lower extent of their travel. A lower set of rollers 109 turn on an axle 111. All of the sprockets 101, 105, & 85 and rollers 109 act to support a plurality of jewel case supports configured as a belt 113. Only four of the individual supports 115 are actually seen, with the extent and remainder of the supports represented by a dashed line 117. The individual ones of the supports 115 may be attached to adjacent supports 115 by any type of hinging mechanism which is sufficient to support a jewel case in somewhat of a cantilevered fashion, so that the forces in supporting a jewel case in a substantially horizontal position can be borne by the belt 113 in supporting each of the supports 115.

Each support 115 has ends 119 and a mid section 121 which provide a partial cup to and support for at least a part of the 5 sides of the six sided rectangular solid shape of the jewel cases which will fit in each support 115. The curving shape of the supports provides a more attractive look in the event that the whole belt 113 of supports 115 is not completely occupied. The sprocket sets 101 and 105 and the roller set 109 guides and provides stability and tension for the belt 113. The battery tray 31 and switches under the buttons 35 and 37 energize the motor 75 to power the gear set of the motor support and gear set 77 to cause the belt 113 to turn about the sprockets 85, 101, 105 and rollers 109.

Also shown is a pair of optional flexible fiber optic illumination extension 125. The illumination extension 125 is utilized to spotlight the jewel cases at the top of the rack 21 as they pass. The ability to position the extension 125 is important so that the light will be directed back onto the jewel cases. Although two extensions 125 are shown, such is completely optional and only one or none need be used. Where one extension 125 is used, it may preferably be longer so that it may be directed over and downward onto the jewel cases as they pass in review. Also seen on the side support 75 are a number of slots 127 which admit light through the color strips 89. Also seen is a power inlet 129 see on the battery tray 31 to enable battery charging as well as operation through a battery charger or battery replacement transformer, preferably for supplying a direct current supply of power.

Figure 2:
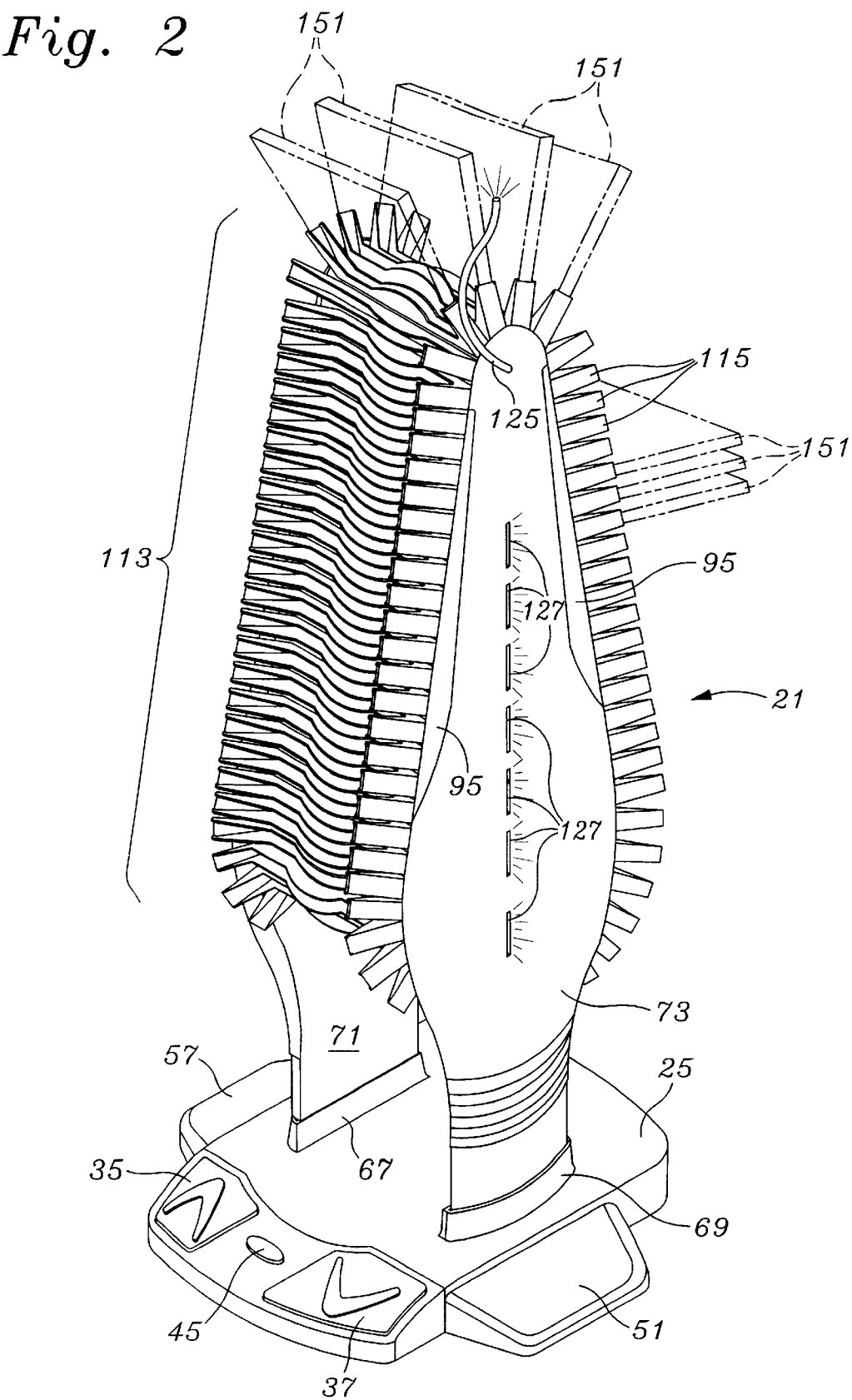
FIG. 2 is a perspective assembled view of the compact disc motorized tower of the present invention.

Referring to FIG. 2, a perspective view of the rack 21 is seen with the full number of supports 115 arranged as a belt to travel in a continuous loop between the side supports 71 and 73. J Also seen are four jewel cases 151 at the top of FIG. 2 to illustrate the angular separation which occurs at the top of the rack 21. Also shown are three jewel cases in generally parallel orientation on the back side of the rack 21 to show the general parallel orientation as well as to show the general parallel and separated orientation of the jewel cases 151 when they are at their most closely adjacent condition. As such, each jewel case 151 is protected, its edge can be seen, and thus it can be selected from either the top of the rack 21 or from the sides. The supports 115 can be formed to adequately grasp each jewel case 151 by friction fit along the edges or any other mechanism to enable the jewel case 151 to be supported in any orientation. At the bottom of the belt 113, note that there is adequate clearance for the jewel cases 151 and that the jewel cases 151 will not fall from its support 115 even in a completely inverted position as it passes closest to the base cover 25 between the side supports 71 and 73.

Figure 3:
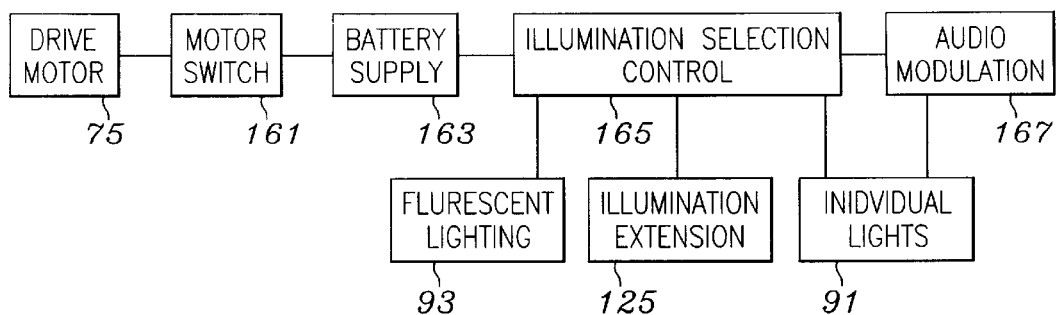
FIG. 3 is a block diagram to illustrate one of several control schemes which may be used to operate the compact disc motorized tower rack of FIGS. 1 & 2.

Referring to FIG. 3, one possible control scheme is shown in a block diagram. Drive motor 75 is as was seen in FIG. 1. A MOTOR SWITCH block 161 is electrically connected to the drive motor 75 and represents the switches associated with the buttons 35 and 37 seen in FIG. 1. MOTOR SWITCH block 161 enables power from a BATTERY SUPPLY block 163 which represents the batteries which would fit in the battery tray 31.

BATTERY SUPPLY block 163 is connected to an ILLUMINATION SELECTION CONTROL block 165 and may be controlled with the button 45 seen in FIG. 1 or it may be an automatic control. An ILLUMINATION SELECTION CONTROL block 165 is also connected to an AUDIO MODULATION block 167. The AUDIO MODULATION block 167, along with the ILLUMINATION SELECTION CONTROL block 165, are also connected to individual lights 91. In this configuration, audio modulation control can be had through the illumination selection control or direct, and the individual lights 91 can be energized by either or both of the ILLUMINATION SELECTION CONTROL block 165 or AUDIO MODULATION block 167. Also connected to the ILLUMINATION SELECTION CONTROL block 165 is the illumination extension 125 seen in FIGS. 1 & 2, and the fluorescent lighting 93 seen in FIG. 1.

Figure 4:
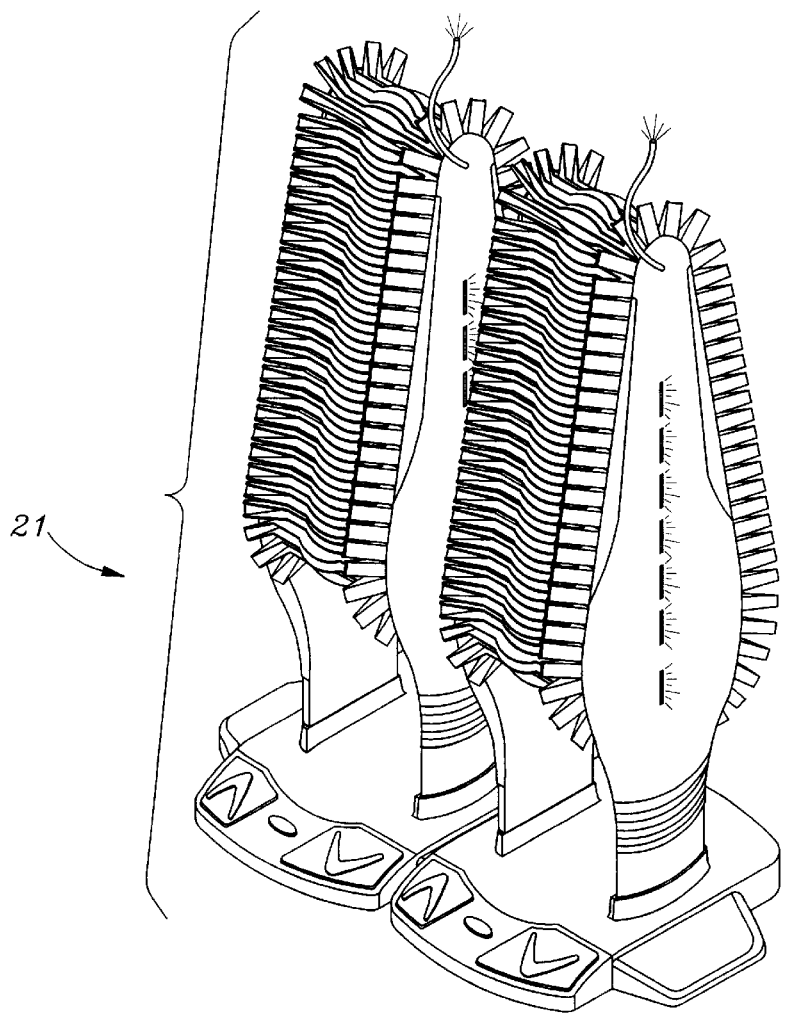
FIG. 4 is a perspective view of two of the compact disc motorized towers of the present invention with two of their side stabilization feet removed and shown in interlocked side-by-side view with a single stabilization foot shown at each end.

Referring to FIG. 4, a pair of racks 21 are shown in side by side relation as a pair of engaged racks. Side stabilization foot 51 is removed from the rack 21 on the left and side stabilization foot 57 is removed from the rack 21 on the right in order to interlock the base cover 25 and base plate 23 assemblies together. The side stabilization of the two racks 21 is bolstered. In addition, where the electrical connections 59 are connected, power may be shared, or actuation may occur simultaneously, or the modes of operation may be distributed.

While the present invention has been described in terms of a motorized compact disc for storing, displaying and viewably reviewing compact disc jewel cases in the form of a tower, the principles contained therein are applicable to other appliances using a belt-type movement of stored articles for storage, display, review and in which the articles can be both removed and replaced in a structure having a sturdy support.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A motorized compact disc case rack comprising:
   a base housing;
   a pair of opposing side supports;
   a plurality compact case disc case supports arranged as a continuous belt between said pair of opposing side supports;
   a motor assembly mechanically linked to rotate said plurality compact case disc case supports arranged as a continuous belt; and
   power switch selection supported by at least one of said base housing and one of said pair of opposing side supports electrically connected to supply power to said motor assembly to drive said motor assembly to rotate said plurality compact case disc case supports.

2. The motorized compact disc case rack as recited in claim 1 wherein said pair of opposing side supports are vertical and both have an upper portion and wherein a path of travel of said continuous belt of said plurality compact case disc case supports have a smallest radius of turn arranged at said upper portion.

3. The motorized compact disc case rack as recited in claim 1 wherein said pair of opposing side supports are vertical and both have an upper portion and further comprising an illumination extension extending from said upper portion and adjustably directable in a direction of said continuous belt of said plurality compact case disc case supports.

4. The motorized compact disc case rack as recited in claim 1 and further comprising a fluorescent light carried adjacent one of said pair of opposing side supports.

5. The motorized compact disc case rack as recited in claim 1 and further comprising a plurality of individual lights carried adjacent one of said pair of opposing side supports.

6. The motorized compact disc case rack as recited in claim 5 and further comprising an audio modulation circuit operable connected to said plurality of said individual lights to vary an intensity of said plurality of said individual lights in response to sounds in a surrounding area of said the vicinity of said motorized compact disc case rack.

7. The motorized compact disc case rack as recited in claim 1 wherein power switch selection includes a first switch button operating a motor switch to drive said motor assembly to rotate said plurality compact case disc case supports in a first direction, and a second switch button operating a motor switch to drive said motor assembly to rotate said plurality compact case disc case supports in a second direction.

8. The motorized compact disc case rack as recited in claim 1 and further comprising:
   a first side stabilization foot attached to a first side of said base housing; and
   a second side stabilization foot attached to a second side of said base housing, said first and second side stabilization foot stabilize said motorized compact disc case rack against side to side forces.

9. The motorized compact disc case rack as recited in claim 8 and wherein said first side of said base housing includes a first connection member for interfitting with a second connection member of said first stabilization foot and wherein said second side of said base housing includes a second connection member for interfitting with a first connection member of said second stabilization foot.

10. The motorized compact disc case rack as recited in claim 9 and wherein a first compact disc case rack has its first stabilization foot removed to expose its first connection member and wherein a second compact disc case rack has its second stabilization foot removed to expose its second connection member and wherein said first connection member of said first compact disc case rack engages and is connected to said second connection member of said second compact disc case rack to form a pair of engaged said motorized compact disc case racks.

11. The motorized compact disc case rack as recited in claim 1 wherein said continuous belt is arranged in the form of an isosceles triangular shape.

12. The motorized compact disc case rack as recited in claim 11 wherein said continuous belt extends over an upper gear set and a pair of spaced apart lower gear sets.

13. The motorized compact disc case rack as recited in claim 12 wherein said pair of spaced apart lower gear sets are arranged level to each other.

14. The motorized compact disc case rack as recited in claim 12 wherein said motor assembly is mechanically linked to rotate said plurality compact case disc case supports arranged as a continuous belt by engagement of said belt nearer said upper gear set than said pair of spaced apart lower gear sets.

15. The motorized compact disc case rack as recited in claim 12 wherein said upper gear set and said lower gear sets each comprise a pair of spaced apart sprockets.

* * * * *